United States Patent Office 3,224,997
Patented Dec. 21, 1965

3,224,997
ALUMINUM-TITANIUM DIOXIDE FILLED THERMOPLASTIC RESIN COMPOSITIONS
Paul H. Hunter, Highland Park, N.J., assignor to Union Carbide Corporation, a corporation of New York
No Drawing. Continuation of application Ser. No. 587,210, May 25, 1956. This application Mar. 23, 1962, Ser. No. 182,112
5 Claims. (Cl. 260—41)

This application is a continuation of my earlier application entitled "Thermoplastic Resin Compositions," Serial No. 587,210, filed May 25, 1956, which is now abandoned.

This invention relates to thermoplastic resin compositions, and has for its principal object novel compositions having improved (higher) opacity, good characteristics of color and good physical properties.

Opaque thermoplastic resin compositions are used to prepare film, sheet, coatings, molded and extruded sections of all sorts; laminar structures and the like which go into a large number of divers applications such as: shower curtains; draperies; upholstery sheeting; wall tile; floor tile; venetian blind slats; tapes; plastic playing cards; construction panels; containers; instrument housing; kick plates; coatings on paper, cardboard, metal foil and other substrates; instrument scales; dial faces; and many others. The numerous applications in which opaque thermoplastic resin compositions are employed present a variety of problems which may be generally summarized as follows:

(1) To provide light colored, particularly white, thermoplastic resin compositions having greater opacity;
(2) To provide thermoplastic resin compositions having greater opacity and adequate degrees of such physical properties as impact strength flexural fatigue resistance, and printability;
(3) To provide a light colored, particularly white thermoplastic resin compositions having a higher degree of opacity and adequate degrees of such physical properties as impact strength and flexural fatigue resistance.

Heretofore, opacity has been achieved by loading pigments into the resin composition, with titanium dioxide, the preferred pigment and opacifier for white compositions. This method and the resultant compositions are inadequate in several respects.

Many resin compositions, including those containing mixtures of a polyvinyl chloride or vinyl chloride-vinyl acetate copolymer, and the vinyl chloride-octyl acrylate copolymer resins, cannot be made sufficiently opaque for exacting applications with any reasonable amount of titanium dioxide. In all cases, the degree of opacity which can be achieved with titanium dioxide is limited. Opacity increases progressively with increasing titanium dioxide concentration up to about 10 to 20%; but higher concentrations of titanium dioxide provide relatively little additional opacity. Moreover, concentrations of titanium dioxide over about 18 to 20%, have an adverse effect on several important properties.

Compounds containing up to about 15–18% $TiO_2$ have better calendering characteristics than the corresponding unpigmented compositions; but higher concentration, i.e., more than about 18 to 20%, degrade calendering behaviors. For instance, at about 25% $TiO_2$ content, the calender roll banks become so rough and "finger" so badly (e.g., become discontinuous with part of the bank separating away from the main bank) as to make the operation difficult at best, and in the case of rigid compositions, impractical.

Any amount of $TiO_2$ (and other such fillers) tends to degrade flexural fatigue life; but the flexural fatigue life of compositions containing as much as about 18% $TiO_2$ is still generally acceptable for most applications, but compositions containing more than about 18% to 20% $TiO_2$ are not generally acceptable for those numerous applications in which the film or sheet must have a flexural fatigue life equivalent to the ability to sustain about 50,000 flexural cycles when tested by the method hereinafter described in Example 1.

Titanium dioxide imparts a yellowish tone which is often undesirable and must be masked with color toners, and which increases with increasing $TiO_2$ concentration. This yellow tone is especially objectionable in white compositions at about 20% or more $TiO_2$ content.

High $TiO_2$ concentrations are expensive, because of the cost of the pigment itself and because it increases product density appreciably and thereby increases the weight of material required to cover a unit area.

The opacity provided by titanium dioxide cannot be increased to any significant extent either by using more rigorous compounding procedures designed to provide superior pigment dispersion, nor by using auxiliary pigments and fillers such as antimony oxide, zinc oxide, calcium carbonate and the like in combination with the titanium dioxide.

On the other hand $TiO_2$ addition improves impact strength, with the majority of the improvement realized by the time the $TiO_2$ content is up to about 20% to 25%. Still higher concentrations, up to about 36% provide substantially no further improvement; and at still higher concentrations, impart drops off rapidly. Because of this favorable contribution to impact strength, the presence of up to about 18% to 20%, and in some special cases even up to about 25% $TiO_2$ is desirable.

This invention is based on the discovery that a relatively small proportion of aluminum pigment in combination with concentrations of titanium dioxide pigment (or substantially equivalent other white pigment such as zinc oxide) within the general range customarily used, imparts greatly increased opacity to thermoplastic resin compositions without imparting physical properties or color.

All thermoplastic resins and mixtures are usable in this invention. Typical of the resins and resin mixtures which have given particularly good results are the following: (1) 3:1 mixture of vinyl chloride-vinyl acetate copolymer with vinyl chloride-octyl acrylate copolymer; (2) vinyl chloride (90%)–vinyl acetate (10%) copolymer with vinyl chloride (85%)–vinyl acetate (15%) copolymer; (3) a polyvinyl chloride resin; (4) a polyethylene resin, (5) a 70:30 polystyrene:rubber mixture, and (6) a plasticized polyvinyl chloride resin composition.

Commercial aluminum powders and pastes of both the leafing and nonleafing variety are useful. Commercial grades of aluminum powder frequently contain up to about 5% aluminum oxide or up to about 3% of a lubricant such as stearic acid or both. Such grades are also suitable. Best results are generally obtained with those powders and pastes in which the aluminum particle size is such that the covering area on water of the metal content is from about 7,000 to about 25,000 square centimeters per gram, as determined by the method of Edwards and Mason (Ind. Eng. Chem., Anal. Ed., vol. 6, p. 159, May 1934). Smaller particle sizes, such as are used in extra fine lining pastes and the like, i.e., water covering value about 30,000 sq. cm./gm. and above, cause an unfavorably greater degree of greying. With larger particle size grades such as are referred to as "flitters" and the like, i.e., water covering value less than about 3,000 to perhaps 6,000 sq. cm./gm. individual particles are discretely visible and impart a speckled appearance to the product.

The preferred concentration of aluminum as a percentage of the entire composition, is as follows:

(a) About 0.01% to 0.1%, usually not over 0.05%, for light and pastel colored, including white, compositions;
(b) About 0.01% to 0.3% for dark colored compositions and for applications in which color and impact requirements are not stringent.

Range (a) provides combinations of opacity, color (e.g., whiteness), impact strength, flexural fatigue resistance, printability and print retention, hitherto unattainable. Range (b) provides opacity and the previously cited flexural fatigue and cost advantages attendant on using lower $TiO_2$ concentrations.

The broadest useful range of concentration of titanium dioxide is about 2.5% to 25%. About 6% to 20% provides a good balance of opacity, color, strength, etc.; and the optimum balance of said properties is generally obtained with about 12% to 18%, all on the basis of the entire composition as 100%.

When present in concentrations up to about 0.1% aluminum imparts a blue cast which is preferable, particularly in white compositions, to the yellow cast imposed by high concentrations of titanium dioxide. When present in concentrations of about 0.1% and above, Al imparts a grey cast which intensifies with increasing Al content. Impact strength drops with increasing Al concentration up to about 0.1%. Additional aluminum, i.e., over about 0.1%, has substantially no additional effect on impact.

The opacifiers can be incorporated into the thermoplastic resin composition by any of the methods generally used to mix and compound such thermoplastic resin compositions such as by mixing in paddle type, ribbon or conical blenders, on two roll mills, in Banbury and other screw type mixers, in extruders, and by other known methods. In larger scale operations, it is advisable to prewet the aluminum powder to prevent its dusting and forming explosive aluminum-in-air suspensions. The aluminum can be prewetted with one of the liquid components of the composition such as the stabilizers, lubricants or plasticizers. In the absence of liquid components, it may be wetted with a small amount, about its own volume, of an inert liquid such as mineral oil or water which may be allowed to remain in the composition or removed during the subsequent mixing and compounding operations. Alternatively, it can be wetted, mixed into a small amount of resin and the wetting agent removed; and this aluminum-resin concentrate or masterbatch can then be incorporated into the thermoplastic resin composition in any of the usual manners.

EXAMPLE 1

Seven 4 lb. mixtures (samples A to G) each consisting of 56.6 parts by weight of a vinyl chloride-vinyl acetate copolymer containing 90% vinyl chloride, 18.9 parts of a vinyl chloride-octyl acrylate copolymer containing 80% vinyl chloride, 18 parts titanium dioxide, 0.5 part trioctyl phosphite, 3.0 parts of the diglycidyl ether of 2,2-bis-(p-hydroxyphenyl)-propane, 2.0 parts basic carbonate of white lead, 1.0 part of 60:40 barium-cadmium laurate, and the number of parts shown in Table I of aluminum powder having an average covering capacity (on water) of 17,000 sq. cm./gm. as determined by the method of Edwards and Mason, Ing. Eng. Chem., Anal. Ed., 6, 159 (May 1934), were processed and tested in the following manner.

The entire mixture was blended in a paddle mixer or ribbon blender for about 10 minutes at room temperature, mixed and fluxed in a Banbury mixer for about 5 minutes under 10 to 20 p.s.i. ram pressure and with cooling water circulating through the Banbury rotor and jacket at such a rate that the mass temperature rose gradually to about 150° C. during this interval; fluxed and sheeted on a 160° C. two-roll mill and end-passed five times thorugh the bight of said mill; then calendered into 4.5, 8 and 10 mil sheet on a 4-roll, inverted L type calender. Calender speed was varied from about 20 to 40 ft./min. depending on film thickness desired. All of the compositions calendered satisfactorily at all sheet thicknesses and calendering speeds.

Sections of the 4.5 mil calendered stocks were press polished down to 4.0 mils; and the light transmittance of these smooth-surfaced, 4.4 mil specimen was measured with a Gardner haze meter according to the method of ASTM D–1003–52, Procedure A. The results are shown in Table I.

Sections of the 8 and 10 mil calender stocks were compression molded together into an homogeneous 8 inch x 8 inch x 0.125 inch sheet and Izod impact strength test pieces were then cut from said sheet, notched and tested according to ASTM D–256–43T.

Card specimens, 2¼ inch x 3½ inch, cut from the 10 mil stocks, were tested for flexural fatigue life in the following manner. A deck consisting of 25 cards was placed in a De Mattia flex tester with the 2¼ inch ends clamped in the rubber covered tester jaws and flexed at the rate of 120 cycles per minute. After 10,000 cycles, a few cards were removed, each was folded in half; the fold was creased sharply between thumb and forefinger; and the crease, which was parallel to the 2¼ inch edges and midway between them, was examined for cracks, breaks and other defects indicative of failure. The original population of the deck was restored by adding the requisite number of fresh cards thereto; the replenished deck subjected to an additional 10,000 cycles; and a few cards which had endured the full 20,000 cycles, i.e., not "replacement" cards, were removed, folded, creased and examined as before. The original population of the deck was again restored with fresh cards, an additional 10,000 cycles were imposed, and the above-described observation and flexing sequence was repeated until fatigue was manifest by the presence of a significant number of failing cards. Flexural fatigue lifes determined in this manner are shown in Table I.

*Table I*

| Sample | A | B | C | D | E | F | G |
| --- | --- | --- | --- | --- | --- | --- | --- |
| Aluminum Powder (percent) | 0 | 0.05 | 0.10 | 0.20 | 0.40 | 0.45 | 0.50 |
| Light Transmittance (percent) | 8 | 4 | 3 | 1 | 0 | 0 | 0 |
| Izod Impact (ft. lbs./in. notch) | 7.5 | 3.9 | 2.8 | 2.7 | 2.3 | 2.5 | 2.2 |
| Flexural Fatigue Life (cycles × $10^{-3}$) | 70 | 60 | 80 | 80 | 60 | ------ | 60 |

Sections of the 10 mil sheet stocks prepared from compositions of samples A and B were provided with a uniform matte finish by press planishing them at 175° C., then cut to size, printed and spray lacquered by the standard technique used to make playing cards. The two sets of specimens were substantially equivalent to each other and at least as good as commercial thermoplastic playing card stocks with respect to printability, resistance of the print to removal by stripping with pressure sensitive tape, and ink retention under abrasion such as occurs when the cards are slipped over each other in play.

For comparison, eight mixtures, samples H through O, were processed and tested in substantially the same manner as samples A to G. With respect to compositions H to O, each contained the same vinyl chloride-vinyl acetate copolymer resin and vinyl chloride-octyl acrylate copolymer resin used in samples A to G and in the same proportions relative to each other (3:1) and the same stabilizer system, i.e., 0.5 part trioctyl phosphite, 3.0 parts of the diglycidyl ether of 2,2-bis-(p-hydroxyphenyl)propane, 2.0 parts basic carbonate of white lead and 1.0 part of 60:40 barium-cadmium laurate; but progressive amounts of titanium dioxide and no aluminum. The number of $TiO_2$ present in each composition and the rest results obtained are shown in Table II.

*Table II*

| Sample | H | I | J | K | L | M | N | O |
|---|---|---|---|---|---|---|---|---|
| $TiO_2$ (percent) | 0 | 6 | 12 | 18 | 24 | 30 | 36 | 42 |
| Light Transmittance (percent) | 80 | 20 | 12 | 8 | 6 | 5 | 5 | 4 |
| Izod Impact (ft./lbs./in. notch) | 0.7 | 1.2 | 2.1 | 6.9 | 15 | 16 | 17 | 13 |
| Flexural Fatigue Life (cycles $\times 10^{-3}$) | 70 | 70 | 70 | 70 | ---- | 30 | 30 | 30 |

Compositions H, I, J and K calendered satisfactorily. In the case of L, however, the calender banks were somewhat rough and some "fingering" took place. These deficiencies were progressively more severe with M, N and O, in that order. "Fingering" is the term given to the formation of a fingerlike roll of material which separates from the main bank. This behavior requires considerable attention by the operator to maintain continuous operation and causes thickness irrregularities and other quality deficiencies in the product. Also, compositions M, N and O did not feed evenly into the calender, a limitation which would generally make them unacceptable for continuous processing; and continuous attenion was necessary to maintain the uniform feed needed to provide the representative homogeneous samples required for test purposes.

From the foregoing observations and the results shown in Tables I and II, it can be seen that the use of appropriate combinations of aluminum and titanium dioxide provides numerous advantages which cannot be achieved with $TiO_2$ alone.

The new $TiO_2$–Al combinations of this invention can be used advantageously to opacify thermoplastic compositions containing virtually any thermoplastic resin and virtually any of the plasticizers, stabilizers, antioxidants, lubricants, processing aids, colorants and other modifiers variously used in such compositions. This is illustrated by the following example.

EXAMPLE 2

The compositions were processed and 4.0 mil press polished test specimens were prepared in substantially the same manner described in Example 1. The light transmittance of said specimens was measured with an Integrating Sphere Photometer per ASTM D–1003–52, Procedure A.

| | I | II |
|---|---|---|
| Composition (percent by weight): | | |
| Polystyrene, percent | 20.0 | 20.0 |
| 60% Polystyrene—40% GRS | 60.1 | 60.0 |
| Zinc stearate | 0.55 | 0.55 |
| 2,6-di-tert-butyl-p-cresol | 0.35 | 0.35 |
| Tris-nonylphenyl phosphite | 1.00 | 1.00 |
| Titanium dioxide | 18.0 | 18.0 |
| Aluminum powder | 0 | 0.10 |
| Light Transmittance (percent) | 8 | 4 |

| | III | IV |
|---|---|---|
| Composition (percent by weight): | | |
| Polyethylene | 81.7 | 81.6 |
| Zinc stearate | 0.2 | 0.2 |
| p-Tertiary amylphenol/formaldehyde | 0.1 | 0.1 |
| Titanium dioxide | 18.0 | 18.0 |
| Aluminum powder | 0 | 0.1 |
| Light Transmittance (percent) | 9 | 4 |

| | V | VI |
|---|---|---|
| Composition (percent by weight): | | |
| Polyvinyl chloride | 79 | 79 |
| Dibutyl tin laurate maleate | 2.5 | 2.5 |
| Calcium stearate | 0.4 | 0.4 |
| Zinc stearate | 0.1 | 0.1 |
| Titanium dioxide | 18.0 | 18.0 |
| Aluminum powder | 0 | 0.1 |
| Light Transmittance (percent) | 7 | 2 |

| | VII | VIII |
|---|---|---|
| Composition (percent by weight): | | |
| 90% vinyl chloride—10% vinyl acetate copolymer | 68.8 | 68.7 |
| 85% vinyl chloride—15% vinyl acetate copolymer | 10.0 | 10.1 |
| Dibutyl tin laurate maleate | 1.5 | 1.5 |
| Dibutyl tin dilaurate | 0.5 | 0.5 |
| Salol | 0.4 | 0.4 |
| Stearic acid | 0.8 | 0.8 |
| Titanium dioxide | 18.0 | 18.0 |
| Aluminum powder | 0 | 0.1 |
| Light Transmittance (percent) | 7 | 3 |

The optimum proportions of $TiO_2$ and aluminum depend on the particular resinous composition and end-use for which said composition is intended. By way of illustration, relatively thick sections, about 40 to 90 mils thick, of thermoplastic resin compositions are used for wall tile. Consequently, materials employed in this and similar applications need not ordinarily be as opaque as those employed in thinner sections such as are used for playing cards, instrument faces and the like; and a light transmittance (measured on a 4.0 mil sheet as described in Example 1) of the order of 10% is generally acceptable. This degree of opacity can usually be attained with about 0.3–0.1% aluminum is combined with about 4 to 10% $TiO_2$.

By way of further illustration, opaque polyethylene compositions are frequently extrusion coated onto paper, cardboard and other substrates to hide the flaws and imperfections of said substrated. For such purposes, compositions having a light transmittance (measured on a 4.0 mil film as described in Example 1) of about 6% are generally acceptable. Used in this manner, i.e., as an extrusion coating onto paper, a composition consistsing of 94 parts polyethylene resin, 0.1 part di-tert-butyl-p-cresol (DBPC), 6 parts $TiO_2$ and 0.05 part aluminum was substantially equivalent to a composition consisting of 85 parts of the same polyethylene resin, 0.1 part DBPC and 15 parts $TiO_2$ with respect to masking effectiveness. Moreover, the former composition was superior to the latter with respect to covering powder per unit weight, economy and flexural properties because of its lower titanium dioxide content.

Metallic aluminum, in the form of powder, flakes, or paste has been used in thermoplastic resin compositions for "metalizing," as a colorant (grey), as an opacifier, in combination with p-tert-butylphenol as a stabilizer and for other reasons. However, all such prior uses differ from the present invention with respect to at least one of the herein described simultaneous requirements of aluminum concentration, aluminum particle size, and conjoint use of the aluminum with $TiO_2$ (or other white pigment).

Unless otherwise specified, all parts and percentages mentioned herein are by weight.

What is claimed is:

1. An opaque pigmented calenderable normally solid thermoplastic resin composition consisting essentially of a thermoplastic resin, and in intimate admixture therein titanium dioxide pigment and a particulate metallic aluminum pigment, said titanium dioxide pigment being present in an amount of from about 2.5 to about 25 percent by weight based on the total weight of the pigmented resin composition, and said metallic aluminum being present in an amount of from about 0.01 to about 0.10 percent by weight based on the total weight of the pigmented resin composition and being of a particle size such that the covering area on water is from about 7000 to 25,000 square centimeters per gram.

2. The composition of claim 1 wherein the thermoplastic resin is a polyethylene resin.

3. The composition of claim 1 wherein the titanium dioxide is present in an amount of from about 6.0 to about 20 percent by weight based on the total weight of the pigment resin composition.

4. The composition according to claim 1 wherein the titanium dioxide is present in an amount of from about 12 percent to about 20 percent by weight based on the weight of the pigmented resin composition and the metallic aluminum pigmented is present in an amount of from about 0.01 to about 0.05 percent based on the total weight of the pigmented resin composition.

5. The composition according to claim 4 wherein the thermoplastic resin is a polyethylene resin.

References Cited by the Examiner
UNITED STATES PATENTS

| | | | |
|---|---|---|---|
| 2,850,490 | 9/1958 | Canterino et al. | 260—41 |
| 2,878,145 | 3/1959 | Aid et al. | 260—41 |
| 3,041,303 | 6/1962 | Nelson | 260—41 |

MORRIS LIEBMAN, *Primary Examiner.*

ALEXANDER H. BRODMERKEL, *Examiner.*